US011482055B2

(12) United States Patent
Park

(10) Patent No.: US 11,482,055 B2
(45) Date of Patent: Oct. 25, 2022

(54) FAILURE CAUSE ANALYZING SYSTEM USING NUMERICAL DATA OF VEHICLE EQUIPMENT AND METHOD THEREOF

(71) Applicants: Hyundai Motor Company, Seoul (KR); Kia Motors Corporation, Seoul (KR)

(72) Inventor: Hyun Soo Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 493 days.

(21) Appl. No.: 16/743,859

(22) Filed: Jan. 15, 2020

(65) Prior Publication Data

US 2021/0065466 A1 Mar. 4, 2021

(30) Foreign Application Priority Data

Aug. 30, 2019 (KR) ........................ 10-2019-0107338

(51) Int. Cl.
*G07C 5/00* (2006.01)
*G06F 16/28* (2019.01)
*G07C 5/08* (2006.01)

(52) U.S. Cl.
CPC ........... *G07C 5/006* (2013.01); *G06F 16/283* (2019.01); *G07C 5/0816* (2013.01)

(58) Field of Classification Search
CPC ...... G07C 5/006; G07C 5/0816; G06F 16/283
USPC ........................................................ 701/29.1
See application file for complete search history.

(56) References Cited

U.S. PATENT DOCUMENTS

2014/0379201 A1 12/2014 Wanami et al.
2017/0169625 A1 6/2017 Lavie et al.
2018/0276913 A1 9/2018 Garcia et al.
2019/0108691 A1* 4/2019 Tucker .................. G07C 5/006
2021/0014323 A1* 1/2021 Hayes .................. G07C 5/008

FOREIGN PATENT DOCUMENTS

EP 1 870 788 A1 12/2007
EP 3 151 173 A1 4/2017
EP 3 467 604 A1 4/2019
KR 10-2016-0063069 A 6/2016

OTHER PUBLICATIONS

Non-Final Office Action dated Jun. 8, 2022 in U.S. Appl. No. 16/860,694.

* cited by examiner

*Primary Examiner* — Isaac G Smith
(74) *Attorney, Agent, or Firm* — Fox Rothschild LLP

(57) ABSTRACT

A failure cause analyzing system utilizes numerical data of vehicle equipment during vehicle operation and analyzes the equipment numerical data included in running data of the vehicle to select a failure inducible factor, thereby extracting the numerical data of each equipment from the running data of the vehicle even if a failure symptom does not persist and occurs intermittently, and analyzes the equipment numerical data to select the failure inducible factor, so as to reduce the time and the cost necessary for inspecting and repairing the vehicle equipment upon the occurrence of the failure symptom, and to avoid improper or excessive maintenance.

19 Claims, 11 Drawing Sheets

<FIRST OCCURRENCE >

| DATA RECEIVED FROM BIG DATA SERVER | | INFLUENCE INDICATOR | INFLUENCE INDICATOR | INDUCIBLE FACTOR | THE NUMBER OF CUMULATIVE TIMES |
|---|---|---|---|---|---|
| a | MOTOR RPM AVERAGE IN THE SECTION | 1.1 | SMALL INFLUENCE | – | 0 |
| h | AIR-CONDITIONER COMPRESSOR RPM CHANGE SLOPE | 1.3 | MEDIUM INFLUENCE | – | 0 |
| i | PTC POWER AVERAGE | 2 | LARGE INFLUENCE | DOUBT | 1 |
| y | LDC OUTPUT AVERAGE | <1 | IRRELEVANCE | – | 0 |

<SECOND OCCURRENCE>

| DATA RECEIVED FROM BIG DATA SERVER | | INFLUENCE INDICATOR | INFLUENCE INDICATOR | INDUCIBLE FACTOR | THE NUMBER OF CUMULATIVE TIMES |
|---|---|---|---|---|---|
| a | MOTOR RPM AVERAGE IN THE SECTION | 1.05 | SMALL INFLUENCE | – | 0 |
| h | AIR-CONDITIONER COMPRESSOR RPM CHANGE SLOPE | 1.7 | LARGE INFLUENCE | DOUBT | 1 |
| i | PTC POWER AVERAGE | 1.8 | LARGE INFLUENCE | DOUBT | 2 |
| y | LDC OUTPUT AVERAGE | <1 | IRRELEVANCE | – | 0 |

<TWELFTH OCCURRENCE>

| DATA RECEIVED FROM BIG DATA SERVER | | INFLUENCE INDICATOR | INFLUENCE INDICATOR | INDUCIBLE FACTOR | THE NUMBER OF CUMULATIVE TIMES |
|---|---|---|---|---|---|
| a | MOTOR RPM AVERAGE IN THE SECTION | 1.02 | SMALL INFLUENCE | – | 0 |
| h | AIR-CONDITIONER COMPRESSOR RPM CHANGE SLOPE | 1.05 | SMALL INFLUENCE | – | 1 |
| i | PTC POWER AVERAGE | 2.5 | LARGE INFLUENCE | DOUBT | 11 |
| y | LDC OUTPUT AVERAGE | <1 | IRRELEVANCE | – | 0 |

FIG. 2

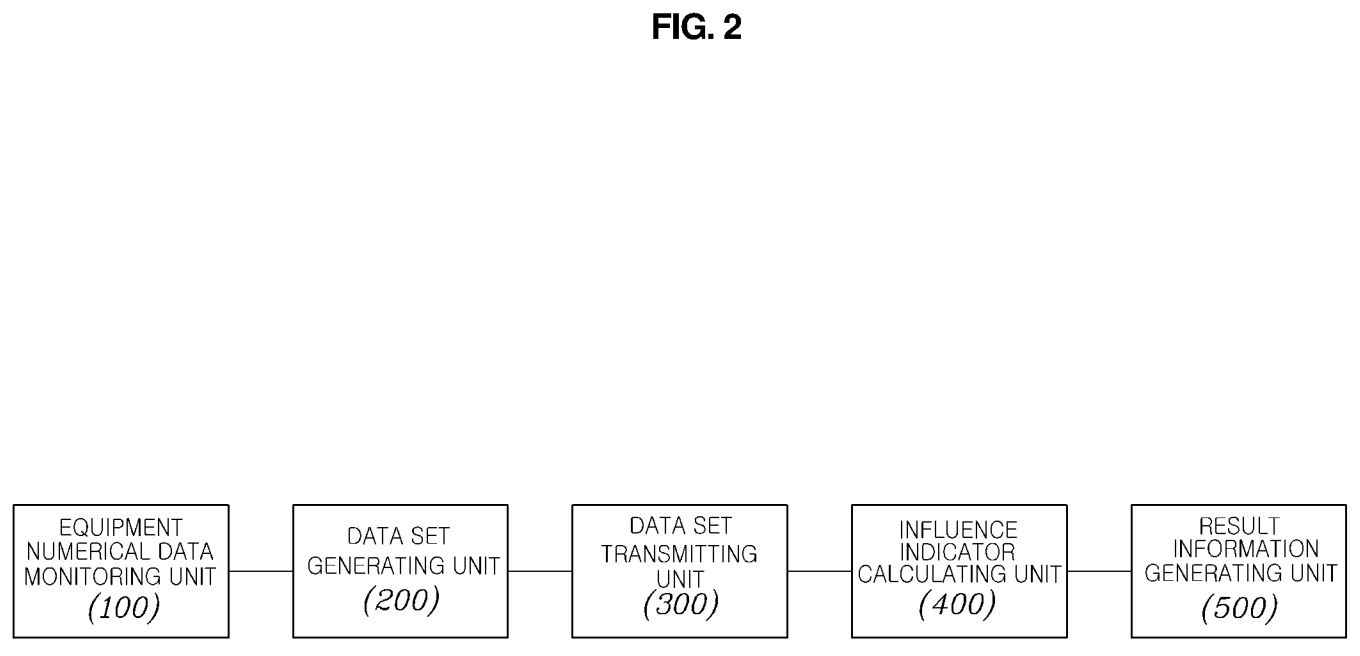

EQUIPMENT NUMERICAL DATA MONITORING UNIT (100)

DATA SET GENERATING UNIT (200)

DATA SET TRANSMITTING UNIT (300)

INFLUENCE INDICATOR CALCULATING UNIT (400)

RESULT INFORMATION GENERATING UNIT (500)

FIG. 7

| data set | ITEMS |
| --- | --- |
| a | MOTOR RPM AVERAGE IN THE SECTION |
| b | GENERATOR RPM AVERAGE IN THE SECTION |
| ...... | ........ |
| h | AIR-CONDITIONER COMPRESSOR RPM CHANGE SLOPE |
| i | PTC (HIGH-VOLTAGE HEATER) POWER AVERAGE |
| ...... | ........ |
| y | LDC OUTPUT AVERAGE |
| z | VEHICLE SPEED AVERAGE |

FIG. 9

<FIRST OCCURRENCE >

| DATA RECEIVED FROM BIG DATA SERVER | | INFLUENCE INDICATOR | INFLUENCE INDICATOR | INDUCIBLE FACTOR | THE NUMBER OF CUMULATIVE TIMES |
|---|---|---|---|---|---|
| a | MOTOR RPM AVERAGE IN THE SECTION | 1.1 | SMALL INFLUENCE | – | 0 |
| h | AIR-CONDITIONER COMPRESSOR RPM CHANGE SLOPE | 1.3 | MEDIUM INFLUENCE | – | 0 |
| i | PTC POWER AVERAGE | 2 | LARGE INFLUENCE | DOUBT | 1 |
| y | LDC OUTPUT AVERAGE | <1 | IRRELEVANCE | – | 0 |

<SECOND OCCURRENCE>

| DATA RECEIVED FROM BIG DATA SERVER | | INFLUENCE INDICATOR | INFLUENCE INDICATOR | INDUCIBLE FACTOR | THE NUMBER OF CUMULATIVE TIMES |
|---|---|---|---|---|---|
| a | MOTOR RPM AVERAGE IN THE SECTION | 1.05 | SMALL INFLUENCE | – | 0 |
| h | AIR-CONDITIONER COMPRESSOR RPM CHANGE SLOPE | 1.7 | LARGE INFLUENCE | DOUBT | 1 |
| i | PTC POWER AVERAGE | 1.8 | LARGE INFLUENCE | DOUBT | 2 |
| y | LDC OUTPUT AVERAGE | <1 | IRRELEVANCE | – | 0 |

<TWELFTH OCCURRENCE>

| DATA RECEIVED FROM BIG DATA SERVER | | INFLUENCE INDICATOR | INFLUENCE INDICATOR | INDUCIBLE FACTOR | THE NUMBER OF CUMULATIVE TIMES |
|---|---|---|---|---|---|
| a | MOTOR RPM AVERAGE IN THE SECTION | 1.02 | SMALL INFLUENCE | – | 0 |
| h | AIR-CONDITIONER COMPRESSOR RPM CHANGE SLOPE | 1.05 | SMALL INFLUENCE | – | 1 |
| i | PTC POWER AVERAGE | 2.5 | LARGE INFLUENCE | DOUBT | 11 |
| y | LDC OUTPUT AVERAGE | <1 | IRRELEVANCE | – | 0 |

FIG. 10

| DATA RECEIVED FROM BIG DATA SERVER | | INFLUENCE INDICATOR | | DETERMINATION | INDUCIBLE FACTOR | THE NUMBER OF CUMULATIVE TIMES |
|---|---|---|---|---|---|---|
| | | MAXIMUM VALUE | AVERAGE VALUE | | | |
| a | MOTOR RPM AVERAGE IN THE SECTION | 1.1 | 1.06 | SMALL INFLUENCE | – | 0 |
| h | AIR-CONDITIONER COMPRESSOR RPM CHANGE SLOPE | 1.7 | 1.35 | SMALL INFLUENCE | – | 1 |
| i | PTC POWER AVERAGE | 2.5 | 2.1 | LARGE INFLUENCE | CONFIRMED | 11 |
| y | LDC OUTPUT AVERAGE | <1 | <1 | IRRELEVANCE | – | 0 |

FAILURE CAUSE ANALYZING SYSTEM USING NUMERICAL DATA OF VEHICLE EQUIPMENT AND METHOD THEREOF

CROSS REFERENCE TO RELATED APPLICATION

The present application claims under 35 U.S.C. § 119(a) the benefit of Korean Patent Application No. 10-2019-0107338 filed on Aug. 30, 2019, the entire contents of which are incorporated by reference herein.

BACKGROUND

(a) Technical Field

The present disclosure relates to a system for analyzing numerical data of equipment included in a vehicle during vehicle operation upon the occurrence of failure and a method thereof, more particularly, to a failure cause analyzing system using numerical data of vehicle equipment during vehicle operation and a method thereof, which may calculate an influence indicator for each failure inducible factor if a numerical data value of the vehicle equipment is determined to be out of a predetermined reference range.

(b) Description of the Related Art

According to a conventional failure cause analyzing method, a corresponding failure cause may be analyzed and repaired only if a failure situation can be reproduced in a vehicle upon receipt at a service center.

Further, a method for removing and disassembling a plurality of interlocked apparatuses to analyze the failure cause in a situation where the same failure situation is reproduced may result in excessive time and cost necessary for analyzing the failure cause and repairing the same.

Further, in the case where a failed apparatus is an important component of the vehicle, replacement of the entire apparatus (or interlocked apparatuses) may be required, particularly if vehicle maintenance is performed incorrectly if the failure cause is accurately confirmed.

SUMMARY

An object of the present disclosure is to provide a failure cause analyzing system, e.g., based on big data, using numerical data of vehicle equipment during vehicle operation, which may analyze the numerical data of the vehicle equipment included in running information of a vehicle to calculate an influence indicator for each expected failure inducible factor and select the failure inducible factor(s) through a relative size of the influence indicator and a number of cumulative times the influence indicator is calculated to be greater than or equal to a reference value, thereby confirming the failure inducible cause even in a situation where occurrence of the failure inducible factor does not persist and occurs intermittently.

A failure cause analyzing system using numerical data of vehicle equipment during vehicle operation according to an embodiment of the present disclosure may include an equipment numerical data analyzing apparatus for generating at least one among a failure inducible factor data set, a normal state data set, and a state recovery data set to transmit it to a big data server if a value of the equipment numerical data is measured out of a predetermined reference range by monitoring the equipment numerical data of a vehicle, and selecting a failure inducible factor based on a calculated influence indicator by receiving data corresponding to the data set from the big data server and calculating the influence indicator for each failure inducible factor and the big data server for transmitting the received data corresponding to the data set to the equipment numerical data analyzing apparatus.

According to an embodiment of the present disclosure, an equipment numerical data analyzing apparatus may include an equipment numerical data monitoring unit for periodically receiving vehicle state information including equipment numerical data from a plurality of sensors installed in a vehicle, and monitoring whether the received equipment numerical data value is out of a predetermined reference range; a data set generating unit for setting a failure state section and a normal state section according to a predetermined reference if the equipment numerical data value is out of the predetermined reference range, and generating a failure inducible factor data set and a normal state data set composed of a plurality of failure inducible factor data for the failure state section and the normal state section; a data set transmitting unit for transmitting the generated data set to a big data server; an influence indicator calculating unit for receiving data corresponding to the data set from the big data server, and calculating an influence indicator for each failure inducible factor by using the received data; and a result information generating unit for generating analysis result information by selecting the failure inducible factor based on the calculated influence indicator.

According to an embodiment of the present disclosure, the data set generating unit may set the section from the time point at which the equipment numerical data value has been measured if the equipment numerical data value is out of the predetermined reference range to before a predetermined time to the failure state section, and set the section from the starting time point of the failure state section to before a predetermined time to the normal state section.

According to an embodiment of the present disclosure, the equipment numerical data monitoring unit may monitor whether the equipment numerical data value received after the failure state section falls within the predetermined reference range again, the data set generating unit may set the section from the time point having fallen within the predetermined reference range to before a predetermined time to a state recovery section to generate a recovery time point data set composed of a plurality of failure inducible factor data for the state recovery section, and the data set transmitting unit may transmit the generated recovery time point data set to the big data server.

According to an embodiment of the present disclosure, the result information generation unit may reflect the calculated influence indicator and the number of cumulative times according to the influence indicator to select the failure inducible factor.

According to an embodiment of the present disclosure, the influence indicator calculating unit may periodically receive a failure state data set and the recovery state data set, and calculate the influence indicator for each recovery inducible factor by using data corresponding to the received failure state data set and recovery state data set, and the result information generating unit may select the failure inducible factor based on the calculated influence indicator to reflect it to the analysis result information.

According to an embodiment of the present disclosure, the analysis result generating unit may reflect the calculated influence indicator and the number of cumulative times according to the influence indicator to select the failure inducible factor.

According to an embodiment of the present disclosure, a failure cause analysis apparatus based on big data using numerical data of vehicle equipment during vehicle operation may include an equipment numerical data monitoring unit for periodically receiving vehicle state information including equipment numerical data value from a plurality of sensors installed in a vehicle, and monitoring whether the received equipment numerical data value is out of a predetermined reference range; a data set generating unit for setting a failure state section and a normal state section according to a predetermined reference if the equipment numerical data value is out of the predetermined reference range, and generating a failure inducible factor data set and a normal state data set composed of a plurality of failure inducible factor data for the failure state section and the normal state section; an influence indicator calculating unit for calculating an influence indicator for each failure inducible factor by using data corresponding to the failure inducible factor data set and the normal state data set; and a result information generating unit for generating analysis result information by selecting the failure inducible factor based on the calculated influence indicator.

According to an embodiment of the present disclosure, a failure cause analyzing method based on big data using numerical data of vehicle equipment during vehicle operation may include monitoring equipment numerical data of a vehicle, generating at least one among a failure inducible factor data set, a normal state data set, and a state recovery data set to transmit it to a big data server if a value of the equipment numerical data is measured out of a predetermined reference range, and selecting a failure inducible factor based on a calculated influence indicator by receiving data corresponding to the data set from the big data server and calculating the influence indicator for each failure inducible factor; and transmitting the received data corresponding to the data set to the equipment numerical data analyzing apparatus.

According to an embodiment of the present disclosure, an equipment numerical data analyzing method may include periodically receiving vehicle state information including equipment numerical data from a plurality of sensors installed in a vehicle, and monitoring whether the received equipment numerical data value is out of a predetermined reference range; setting a failure state section and a normal state section according to a predetermined reference if the equipment numerical data value is out of the predetermined reference range, and generating a failure inducible factor data set and a normal state data set composed of a plurality of failure inducible factor data for the failure state section and the normal state section; transmitting the generated data set to a big data server; receiving data corresponding to the data set from the big data server, and calculating an influence indicator for each failure inducible factor by using the received data; and generating analysis result information by selecting the failure inducible factor based on the calculated influence indicator.

According to an embodiment of the present disclosure, the generating the data set may set the section from the time point at which the equipment numerical data value has been measured if the equipment numerical data value is out of the predetermined reference range to before a predetermined time to the failure state section, and set the section from the starting time point of the failure state section to before a predetermined time to the normal state section.

According to an embodiment of the present disclosure, the monitoring may monitor whether the equipment numerical data value received after the failure state section falls within the predetermined reference range again, the generating the data set may set the section from the time point having fallen within the predetermined reference range to before a predetermined time to a state recovery section to generate a recovery time point data set composed of a plurality of failure inducible factor data for the state recovery section, and the transmitting the data set to the big data server may transmit the generated recovery time point data set to the big data server.

According to an embodiment of the present disclosure, the generating the analysis result information may reflect the calculated influence indicator and the number of cumulative times according to the influence indicator to select the failure inducible factor.

According to an embodiment of the present disclosure, the calculating the influence indicator may periodically receive a normal state data set and a recovery state data set, and calculate the influence indicator for each recovery inducible factor by using the data corresponding to the received recovery state data set and normal state data set, and the generating the analysis result information may select the failure inducible factor based on the calculated influence indicator to reflect it to the analysis result information.

According to an embodiment of the present disclosure, the generating the analysis result information may reflect the calculated influence indicator and the number of cumulative times according to the influence indicator to select the failure inducible factor.

According to an embodiment of the present disclosure, an equipment numerical data analyzing apparatus may include an equipment numerical data monitoring unit for periodically receiving vehicle state information including equipment numerical data from a plurality of sensors installed in a vehicle, and monitoring whether the received equipment numerical data value is out of a predetermined reference range; a data set generating unit for setting a failure state section and a recovery state section according to a predetermined reference if the equipment numerical data value is out of the predetermined reference range, and generating a failure inducible factor data set and a normal state data set composed of a plurality of failure inducible factor data for the failure state section and the recovery state section; a data set transmitting unit for transmitting the generated data set to a big data server; an influence indicator calculating unit for receiving data corresponding to the data set from the big data server, and calculating an influence indicator for each failure inducible factor by using the received data; and a result information generating unit for generating analysis result information by selecting the failure inducible factor based on the calculated influence indicator.

According to an embodiment of the present disclosure, the equipment numerical data monitoring unit may monitor whether the equipment numerical data value received after the failure state section falls within the predetermined reference range again, the data set generating unit may set the section from the time point having fallen within the predetermined reference range to before a predetermined time to a state recovery section to generate a recovery time point data set composed of a plurality of failure inducible factor data for the state recovery section, and the data set transmitting unit may transmit the generated recovery time point data set to the big data server.

According to an embodiment of the present disclosure, an equipment numerical data analyzing method may include periodically receiving vehicle state information including equipment numerical data from a plurality of sensors installed in a vehicle, and monitoring whether the received equipment numerical data value is out of a predetermined reference range; setting a failure state section and a recovery state section according to a predetermined reference if the equipment numerical data value is out of the predetermined reference range, and generating a failure inducible factor data set and a normal state data set composed of a plurality of failure inducible factor data for the failure state section and the recovery state section; transmitting the generated data set to a big data server; receiving data corresponding to the data set from the big data server, and calculating an influence indicator for each failure inducible factor by using the received data; and generating analysis result information by selecting the failure inducible factor based on the calculated influence indicator.

According to an embodiment of the present disclosure, the equipment numerical data analyzing method may further include monitoring whether the equipment numerical data value received after the failure state section falls within the predetermined reference range again, generating a recovery time point data set composed of a plurality of failure inducible factor data for a state recovery section by setting the section from the time point having fallen within the predetermined reference range to before a predetermined time to the state recovery section, and transmitting the generated recovery time point data set to the big data server.

According to the present disclosure, it is possible to analyze the numerical data of the equipment included in the running data of the vehicle to select the failure inducible factor, thereby extracting the numerical data of each equipment from the running data of the vehicle even if the failure symptom does not persist and occurs intermittently, and to analyze it to select the failure inducible factor, thereby reducing the time and the cost necessary for inspecting and repairing it upon the occurrence of the failure symptom and preventing the wrong maintenance or the excessive maintenance.

BRIEF DESCRIPTION OF THE DRAWINGS

The above and other objects, features and other advantages of the present disclosure will be more clearly understood from the following detailed description when taken in conjunction with the accompanying drawings, in which:

FIG. 2 is a detailed block diagram of an equipment numerical data analyzing apparatus according to a first embodiment of the present disclosure.

FIG. 7 is a diagram illustrating a data set generated according to an embodiment of the present disclosure.

FIG. 9 is a diagram illustrating a plurality of failure inducible factor analysis table generated every time the failure symptom occurs in order to calculate the influence indicator for each failure inducible factor according to an embodiment of the present disclosure.

FIG. 10 is a diagram illustrating analysis result information actually generated by the failure cause analyzing system based on big data using numerical data of the vehicle equipment during vehicle operation according to an embodiment of the present disclosure.

DETAILED DESCRIPTION OF THE DISCLOSURE

Figure 1:
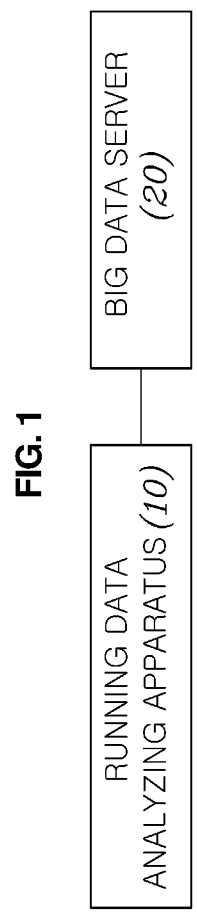
FIG. 1 is a block diagram of a failure cause analyzing system based on big data using numerical data of vehicle equipment during vehicle operation according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings so that those skilled in the art to which the present disclosure pertains may easily carry out the present disclosure. However, the present disclosure may be implemented in various different forms and is not limited to the embodiments described herein.

Further, in the drawings, parts irrelevant to the description are omitted in order to clearly describe the present disclosure, and like reference numerals designate like parts throughout the specification.

Throughout the specification, when a part is said to "include" a certain component, it means that it may further include other components, rather than excluding other components unless specifically stated otherwise.

Hereinafter, a failure cause analyzing system and a method thereof based on big data using numerical data of vehicle equipment during vehicle operation according to an embodiment of the present disclosure will be described with reference to the accompanying drawings.

FIG. 1 is a block diagram of a failure cause analyzing system based on big data using numerical data of vehicle equipment during vehicle operation according to an embodiment of the present disclosure.

Referring to FIG. 1, a failure cause analyzing system based on big data using numerical data of vehicle equipment during vehicle operation according to an embodiment of the present disclosure may include an equipment numerical data analyzing apparatus 10 and a big data server 20.

The equipment numerical data analyzing apparatus 10 may generate at least one among a failure inducible data set, a normal state data set, and a state recovery data set to transmit it to the big data server if a value of the equipment numerical data is measured out of a predetermined reference range by monitoring the equipment numerical data of the vehicle.

Further, according to the embodiment, the equipment numerical data analyzing apparatus 10 may calculate an influence indicator for each failure inducible factor by receiving data corresponding to a data set, and generate analysis result information by selecting the failure inducible factor based on the calculated influence indicator.

The equipment numerical data analyzing apparatus 10 will be described in more detail with reference to FIG. 2.

The big data server 20 may transmit data corresponding to the received data set to the equipment numerical data analyzing apparatus 10.

According to an embodiment of the present disclosure, the big data server 20 may receive a data set from the equipment numerical data analyzing apparatus 10, and transmit it to the equipment numerical data analyzing apparatus by extracting the data corresponding to the data set.

Here, the big data server 20 may be a server having a large capacity including a storage apparatus and computing capability, and is not limited to a server having a specific hardware standard.

According to an embodiment of the present disclosure, the big data server 20 may extract data corresponding to a data item included in the received data set by using the equipment numerical data, and perform processing by using a computational resource of the big data server in the extracting process.

For example, if there is the item of a motor RPM average in a section in the data set, the big data server may extract the data corresponding to the motor RPM average in the section by performing processing of obtaining the average of the motor RPM value among the equipment numerical data in the corresponding section.

According to an embodiment of the present disclosure, the big data server 20 may periodically receive running data from a vehicle to store it therein, and extract data included in the running data corresponding to the failure inducible data set and the normal state data set received from the equipment numerical data analyzing apparatus 1000 to generate it in the form of a data table to transmit it to the equipment numerical data analyzing apparatus 1000.

According to an embodiment of the present disclosure, the big data server may continuously receive and store the equipment numerical data from the vehicle, and process and return the equipment numerical data that has stored the data on the data item included in the data set requested by the equipment numerical data analyzing apparatus, but is not limited thereto, and may transmit raw data for extracting the data item included in the data set to the equipment numerical data analyzing apparatus so that the processing itself is also performed in the equipment numerical data analyzing apparatus.

FIG. 2 is a detailed block diagram of an equipment numerical data analyzing apparatus according to a first embodiment of the present disclosure.

Referring to FIG. 2, the equipment numerical data analyzing apparatus 1000 according to the first embodiment of the present disclosure may further include an equipment numerical data monitoring unit 100, a data set generating unit 200, a data set transmitting unit 300, an influence indicator calculating unit 400, and a result information generating unit 500.

The equipment numerical data monitoring unit 100 may periodically receive vehicle state information including equipment numerical data from a plurality of sensors installed in the vehicle, and monitor whether the received equipment numerical data value is out of a predetermined reference range.

Here, the equipment numerical data may mean arithmetic numerical data obtained from a number of components included in the vehicle, and according to an embodiment of the present disclosure, may mean a motor temperature, a motor RPM, a heater output, an air-conditioner compressor RPM, and the like, but is not limited thereto, and may be used without limitation if it is the numerical data measured through a sensor and other measurable equipments.

According to an embodiment of the present disclosure, the equipment numerical data monitoring unit 100 may continuously monitor whether the equipment numerical data for each equipment is out of a predetermined reference range, and determine that the failure symptom has occurred if it is out of the predetermined reference range to request the data set generating unit 200 to generate the failure inducible factor data set and the normal state data set composed of a plurality of failure inducible factor data in order to analyze the failure cause.

According to an embodiment of the present disclosure, the equipment numerical data monitoring unit 100 may monitor whether the equipment numerical data value received after the failure state section falls within the predetermined reference range again.

According to an embodiment of the present disclosure, if the equipment numerical data value received after the failure state section reaches a predetermined normal state value again, it is determined that it has been recovered to the normal state to set the section from the time point having reached the normal state value to before a predetermined time to a state recovery section, and to request the data set generating unit 200 to generate the recovery time point data set composed of the plurality of failure inducible factor data for the state recovery section.

The data set generating unit 200 may set the failure state section or the normal state section according to a predetermined reference if the equipment numerical data value is out of the predetermined reference range, and generate the failure inducible factor data set and the normal state data set composed of the plurality of failure inducible factor data for the failure state section or the normal state section.

According to an embodiment of the present disclosure, the data set generating unit 200 may determine that the failure symptom has occurred if the equipment numerical data value is out of the predetermined reference range as the monitoring result of the equipment numerical data monitoring unit 100 to set the failure state section and the normal state section according to the predetermined reference in order to analyze the failure cause.

According to the embodiment, the data set generating unit 200 has set the failure state section and the normal state section, and then may generate the failure inducible factor data set and the normal state data set composed of the plurality of failure inducible factor data for the failure state section and the normal state section.

Here, the data set may be generated in the form of a data table composed of a data item capable of analyzing the failure cause among various information included in the equipment numerical data during the corresponding section, but is not limited thereto, and may be used without limitation if it may deliver the item information on data capable of inferring the failure inducible factor.

According to an embodiment of the present disclosure, the data set may include, as the data item, a motor RPM average in the section, a generator RPM average in the section, an air-conditioner compressor RPM change slope, a PTC (high voltage heater) power average, an LDC output average, a vehicle speed average, and the like and may be formed in the form of the data table.

According to an embodiment of the present disclosure, the data set generating unit 200 may set the section from the time point at which the equipment numerical data value has been measured out of the predetermined reference range to before a predetermined time to the failure state section, and set the section from the starting time point of the failure state section to before a predetermined time to the normal state section.

According to the embodiment, the data set generating unit 200 may set the section from the time point at which the equipment numerical data value has been measured out of the predetermined reference range to before the predetermined time to the failure state section, and set the section from the starting time point of the failure state section to before the predetermined time to the normal state section.

According to an embodiment of the present disclosure, the data set generating unit 200 may set the section from the time point at which the equipment numerical data value has been measured if the equipment numerical data value has been out of the predetermined reference range to before a predetermined time to the failure state section, and set the section from the starting time point of the failure state section to before a predetermined time to the normal state section.

According to an embodiment of the present disclosure, the data set generating unit 200 may set the section from the time point having reached the normal state value to before a predetermined time to the state recovery section to generate a recovery time point data set composed of the plurality of failure inducible factor data for the state recovery section.

According to the embodiment, the state recovery section may be set to the section from the time point having reached the normal state value to before the predetermined time.

The data set transmitting unit 300 may transmit the generated recovery time point data set to the big data server.

According to an embodiment of the present disclosure, at least one among the data set of the failure state section, the normal state section, and the state recovery section, which have been generated, may be transmitted to the big data server 20, and the big data server may generate the data matched to the corresponding data set in the form of the data table to transmit it back to the equipment numerical data analyzing apparatus 10.

According to an embodiment of the present disclosure, the data set transmitting unit 300 may transmit the generated recovery section data set to the big data server.

The influence indicator calculating unit 400 may receive the data corresponding to the data set from the big data server, and calculate the influence indicator for each failure inducible factor by using the received data.

According to an embodiment of the present disclosure, the equipment numerical data analyzing apparatus 10 may receive the data corresponding to the data set from the big data server 20, and receive it in the form of the data table.

Here, the data table may mean a data format including numerical data for each of the plurality of failure inducible factors but is not limited thereto.

According to an embodiment of the present disclosure, the influence indicator calculating unit 400 may to calculate the influence indicator by comparing the numerical data of the failure state section and the normal state section with respect to the same failure inducible factor, respectively.

According to an embodiment of the present disclosure, the influence indicator calculating unit 400 may calculate the influence indicator through the following Equation 1:

$$y>x*\text{factor (influence indicator)} \quad \text{[Equation 1]}$$

y: numerical data of the failure inducible factor in the normal state section; and x: numerical data of the failure inducible factor in the failure state section.

According to the embodiment, as the influence indicator moves away from 1, the influence indicator is regarded as relatively large.

According to an embodiment of the present disclosure, the influence indicator calculating unit 400 may periodically receive the failure state data set and the recovery state data set, and calculate the influence indicator for each recovery inducible factor by using the data corresponding to the received recovery state data set and failure state data set.

According to an embodiment of the present disclosure, the influence indicator calculating unit 400 may calculate the influence indicator having reflected the data of the recovery state section through the following Equation 2:

$$y>x*\text{factor(influence indicator)} \quad \text{[Equation 2]}$$

y: numerical data of the failure inducible factor in the failure state section; and x: numerical data of the failure inducible factor in the recovery state section.

According to the embodiment, as the influence indicator moves away from 1, the influence indicator may be regarded as relatively large.

According to an embodiment of the present disclosure, the influence indicator calculating unit 400 may calculate the influence indicator by using the influence indicator calculating process as in the case of using the numerical data of the failure inducible factor of the failure state section even in the case of using the numerical data of the failure inducible factor of the recovery state section in the calculation of the influence indicator.

The result information generating unit 500 may generate analysis result information by selecting a failure inducible factor based on the calculated influence indicator.

According to an embodiment of the present disclosure, it is possible to calculate the influence indicator through the formulas such as the Equations 1 and 2 with respect to each failure inducible factor, and to determine the relatively small and large influence on the failure by comparing the calculated influence indicators.

According to an embodiment of the present disclosure, it is possible to generate the result information by comparing the influence indicator calculated for each failure inducible factor to select, as the failure cause, the failure inducible factor having the largest influence indicator among them.

According to another embodiment of the present disclosure, it is possible to generate the result information by selecting, as the failure cause, the failure inducible factor having a predetermined certain value or more among the influence indicators calculated for each failure inducible factor.

According to an embodiment of the present disclosure, the result information generating unit 500 may reflect the calculated influence indicator and the number of cumulative times according to the influence indicator to select the failure inducible factor.

Figure 3:
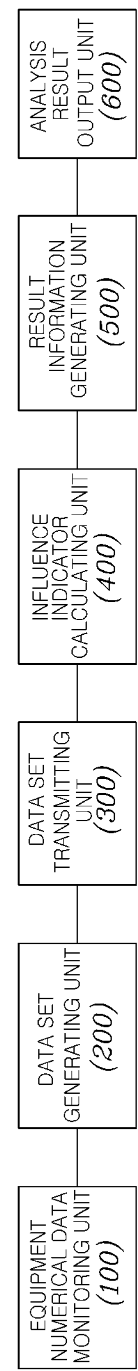
FIG. 3 is a detailed block diagram of an equipment numerical data analyzing apparatus according to a second embodiment of the present disclosure.

FIG. 3 is a detailed block diagram of an equipment numerical data analyzing apparatus according to a second embodiment of the present disclosure.

Referring to FIG. 3, the equipment numerical data analyzing apparatus according to the second embodiment of the present disclosure may further include an analysis result output unit 600 in the equipment numerical data analyzing apparatus according to the first embodiment.

The analysis result output unit 600 may output the analysis result information generated by the result information generating unit 500 to a user.

According to an embodiment of the present disclosure, the analysis result output unit 600 may be connected with a display installed in the vehicle, and may transmit the analysis result information to the display to output it to the user but is not limited thereto, and may be used without limitation if it is an apparatus capable of outputting information to the user such as a speaker.

Figure 4:
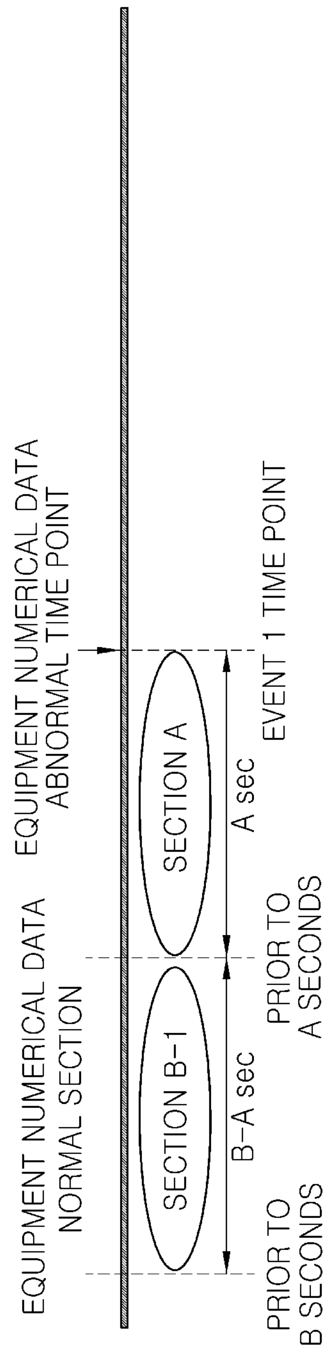
FIG. 4 is a diagram illustrating a failure state section and a normal state section, which are set if an equipment numerical data value is out of a predetermined reference range according to an embodiment of the present disclosure.

FIG. 4 is a diagram illustrating a failure state section and a normal state section, which are set if the equipment numerical data value is out of a predetermined reference range according to an embodiment of the present disclosure.

Referring to FIG. 4, illustrated are a failure state section (A) and a normal state section (B-1), which are set if the equipment numerical data value is out of a predetermined reference range, according to an embodiment of the present disclosure, which may be ones having set the section from the time point at which the equipment numerical data value has been measured to before a predetermined time to the failure state section (A), and having set the section from the starting time point of the failure state section to before a predetermined time to the normal state section (B-1).

Figure 5:
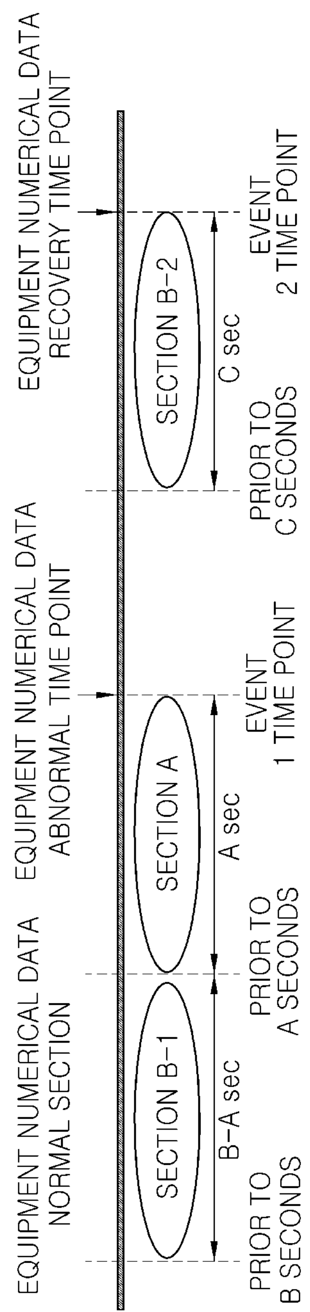
FIG. 5 is a diagram illustrating a failure state section, a normal state section, and a recovery state section, which are set if an equipment numerical data value has been out of the predetermined reference range and then recovered back within the reference range according to an embodiment of the present disclosure.

FIG. 5 is a diagram illustrating a failure state section, a normal state section, and a recovery state section, which are set if the equipment numerical data value has been out of the predetermined reference range and then recovered within the reference range again according to an embodiment of the present disclosure.

Referring to FIG. 5, illustrated are the failure state section (A), the normal state section (B-1), and a recovery state section (B-2) that are set if the equipment numerical data value has been out of the predetermined reference range and then recovered within the reference range again according to an embodiment of the present disclosure, and the recovery state section (B-2) may be set to the section from the time point having reached the normal state value to before a predetermined time.

Figure 6:
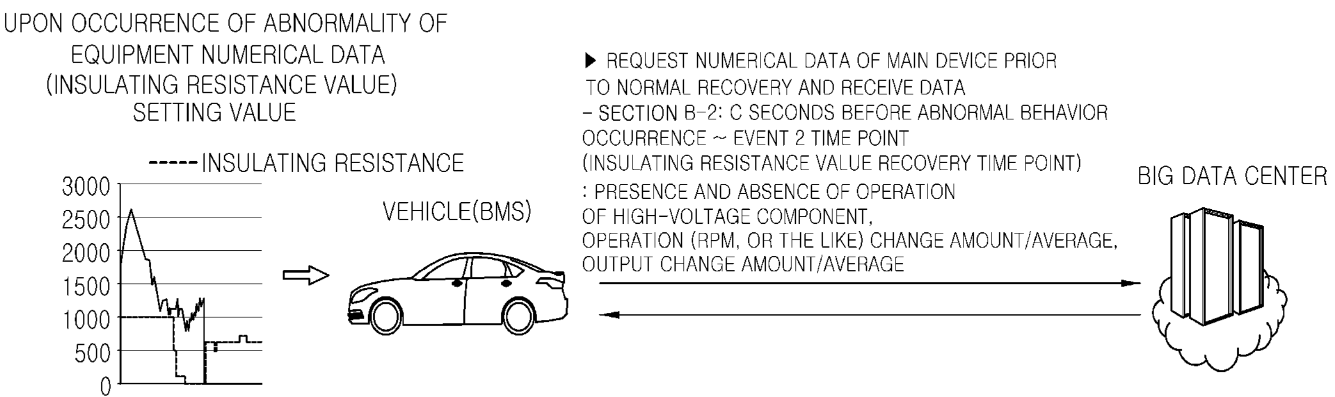
FIG. 6 is a diagram illustrating the flow of data of the case where the equipment numerical data is out of the predetermined reference range in the embodiment that selects a recovery inducible factor to reflect it to analysis result information according to the present disclosure.

FIG. 6 is a diagram illustrating the flow of data of the case where the equipment numerical data is a setting value or more in the embodiment that selects a recovery inducible factor to reflect it to the analysis result information according to the present disclosure.

Referring to FIG. 6, illustrated is the flow of data of the case where the equipment numerical data is out of the reference range is illustrated in the embodiment that selects the recovery inducible factor to reflect it to the analysis result information.

According to an embodiment of the present disclosure, if the equipment numerical data has been measured out of the predetermined reference range and then recovered within the reference range again to return to the failure state and the recovery state from the normal state, the equipment numerical data analyzing apparatus may transmit to the big data server the failure inducible factor data set composed of the plurality of failure inducible factor data for the failure state section, the normal state section, and the state recovery section.

Further, according to the embodiment, it is possible to transmit the data corresponding to the data set received from the big data server to the equipment numerical data analyzing apparatus.

FIG. 7 is a diagram illustrating a data set generated according to an embodiment of the present disclosure.

Referring to FIG. 7, the data set generated according to an embodiment of the present disclosure is illustrated.

According to an embodiment of the present disclosure, the data set may be generated in the form of a data catalog having a predetermined failure inducible factor as an item.

According to an embodiment of the present disclosure, the failure inducible factor may be a motor RPM average in the section, a generator RPM average in the section, an air-conditioner compressor change slope, a PTC power average, an LDC output average, a vehicle speed average, and the like, but is not limited thereto and may be used without limitation if it is factors capable of affecting the failure.

Figure 8:
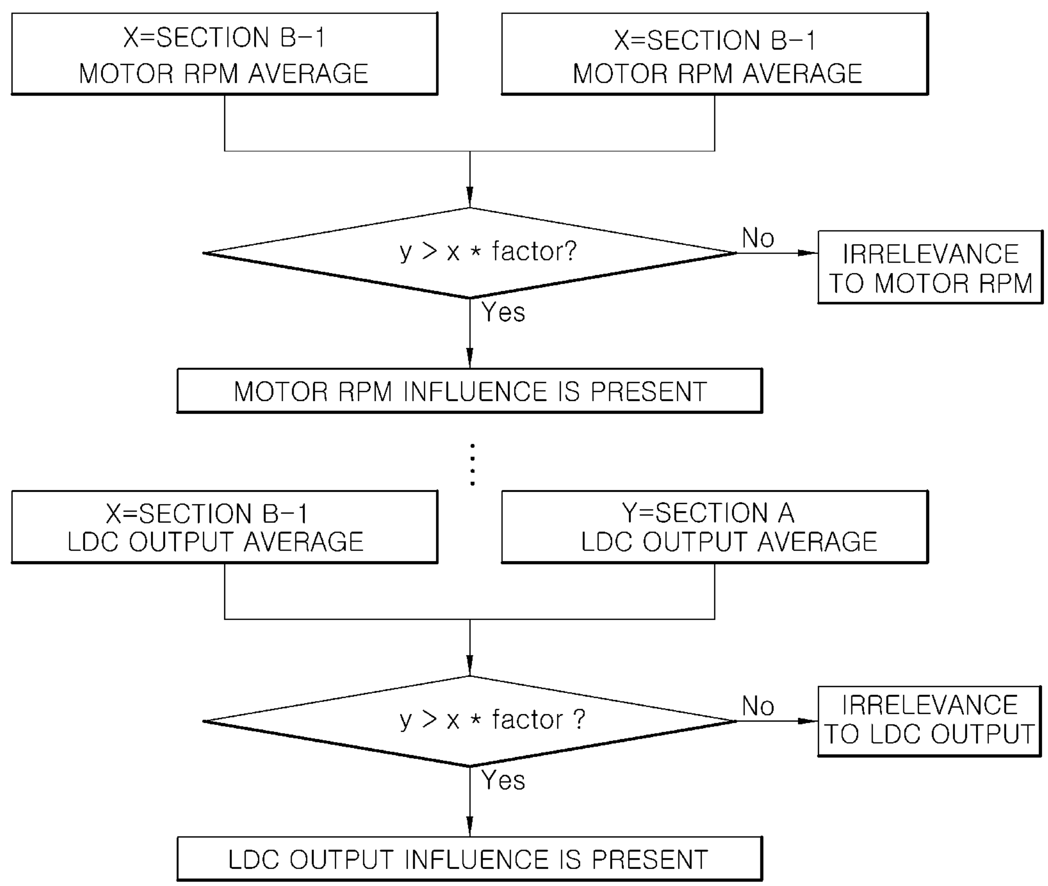
FIG. 8 is a flowchart illustrating a process of calculating an influence indicator for each failure inducible factor according to an embodiment of the present disclosure.

FIG. 8 is a flowchart illustrating a process of calculating an influence indicator for each failure inducible factor according to an embodiment of the present disclosure.

Referring to FIG. 8, illustrated is a process of calculating the influence indicator for each failure inducible factor according to an embodiment of the present disclosure.

According to an embodiment of the present disclosure, it is possible to calculate the influence indicator by using the Equation 1 or 2 by using the data for each failure inducible factor in the failure state section and the normal state section or the failure state section and the state recovery section and to compare it with the influence indicator of other failure inducible factors to relatively compare the sizes of the influence due to the failure.

FIG. 9 is a diagram illustrating a plurality of failure inducible factor analysis tables generated every time the failure symptom occurs in order to calculate an influence indicator for each failure inducible factor according to an embodiment of the present disclosure.

According to an embodiment of the present disclosure, FIG. 9 illustrates a plurality of failure inducible factor analysis table generated every time the failure symptom occurs in order to calculate the influence indicator for each failure inducible factor according to an embodiment of the present disclosure.

According to an embodiment of the present disclosure, if it is determined that the equipment numerical data has been measured out of the predetermined range and the failure state has occurred, the failure inducible factor analysis table may be generated by the number of occurrence times.

According to an embodiment of the present disclosure, each failure inducible factor analysis table may include relative size determination information of the influence factor through the calculated influence indicator, may be expressed as doubt, confirmed, not inducible factor, or the like, and may include it by generating the number of cumulative times according to the influence indicator, that is, information on the number of cumulative times of the inducible factor doubt selection.

According to an embodiment of the present disclosure, if the influence indicator is a predetermined value or less, it may be determined that the influence may not be determined and a predetermined value may be changed and set according to a failure item, a type of vehicle, or the like.

Therefore, it is possible to prevent the misdetermination due to the measurement and the calculation error, and to minimize overfitting.

According to an embodiment of the present disclosure, since the number of cumulative times is also in a state where the influence may not be determined if the influence indicator is a predetermined value or less, the number of times may not be accumulated.

FIG. 10 is a diagram illustrating analysis result information actually generated by the failure cause analyzing system based on big data using numerical data of the vehicle equipment during vehicle operation according to an embodiment of the present disclosure.

Referring to FIG. 10, illustrated is analysis result information generated by selecting the failure inducible factor by using the failure inducible factor analysis result table as in FIGS. 9 and 10 if the actual equipment numerical data has been monitored and measured out of the predetermined reference range.

According to an embodiment of the present disclosure, a reliability numerical value may be included in the analysis result information, and the reliability numerical value may increase as the number of cumulative times increases, and conversely, decrease as the number of cumulative times is smaller.

Figure 11:
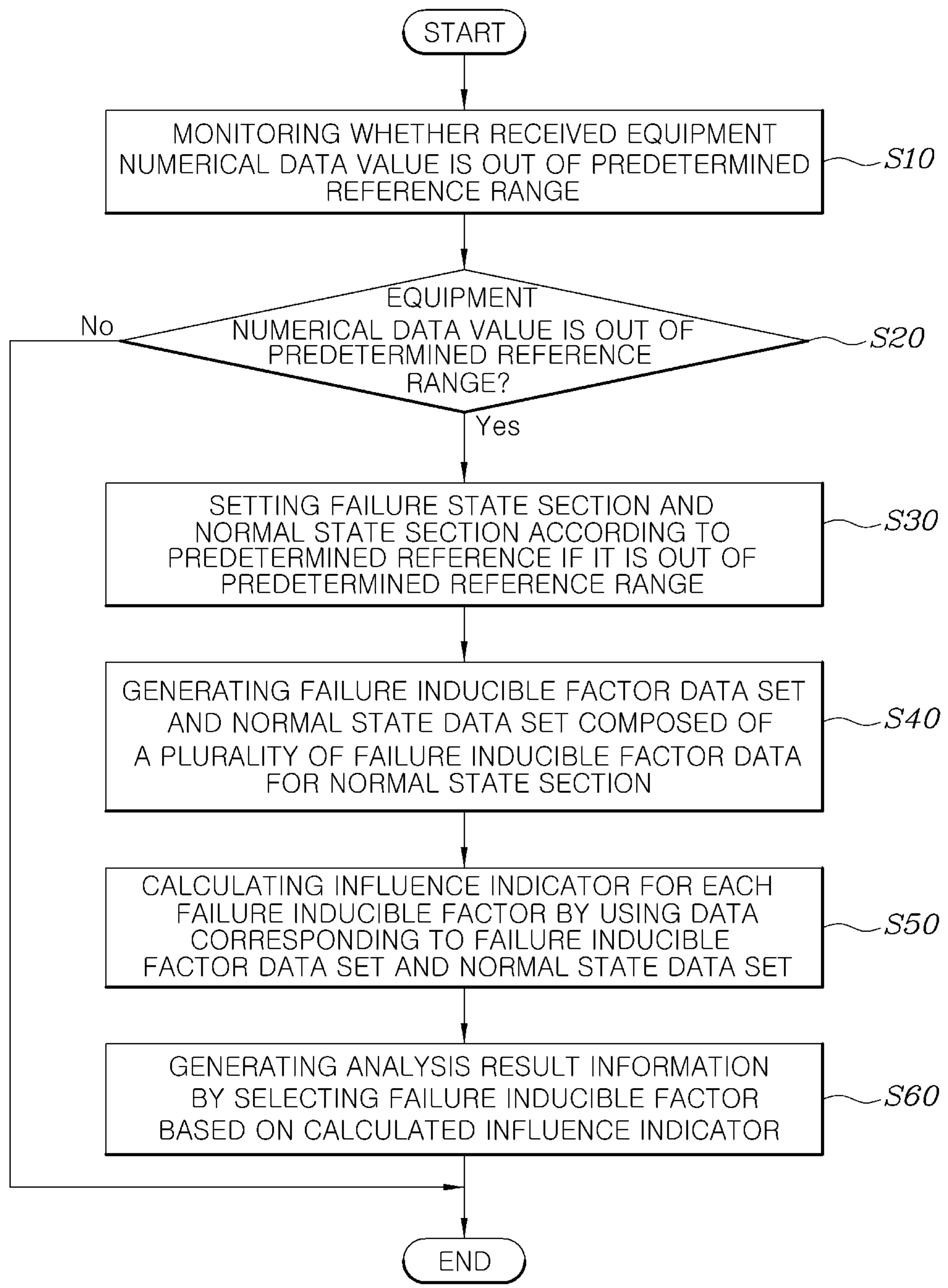
FIG. 11 is a flowchart of a failure cause analyzing method based on big data using numerical data of vehicle equipment during vehicle operation according to an embodiment of the present disclosure.

FIG. 11 is a flowchart of a failure cause analyzing method based on big data using numerical data of vehicle equipment during vehicle operation according to an embodiment of the present disclosure.

It is monitored whether the received equipment numerical data value is out of a predetermined reference range (operation S10).

According to an embodiment of the present disclosure, it is possible to periodically receive vehicle state information including the equipment numerical data from a plurality of sensors installed in the vehicle, and to monitor whether the received equipment numerical data value is out of the predetermined reference range.

According to an embodiment of the present disclosure, it is possible to monitor whether the equipment numerical data value received after the failure state section falls within the predetermined reference range again.

It is determined whether the equipment numerical data value is out of the predetermined reference range (operation S20).

According to an embodiment of the present disclosure, it is possible to continuously monitor whether the equipment numerical data for each equipment is out of the predetermined reference range, and to determine that the failure symptom has occurred in the case of exceeding the reference range to request the generation of the failure inducible factor data set and the normal state data set composed of the plurality of failure inducible factor data in order to analyze the failure cause.

According to an embodiment of the present disclosure, it is possible to determine that it has been recovered to the normal state if the equipment numerical data value received after the failure state section falls within the predetermined reference range again to set the section from the time point having fallen within the reference range to before a predetermined time to a state recovery section, and to request the generation of a recovery time point data set composed of a plurality of failure inducible factor data for the state recovery section.

The failure state section and the normal state section are set according to a predetermined reference if it is out of the predetermined reference range (operation S30).

According to an embodiment of the present disclosure, it is possible to set the failure state section or the normal state section according to the predetermined reference if the equipment numerical data value is out of the predetermined reference range.

According to an embodiment of the present disclosure, it is possible to determine that the failure symptom has occurred if the equipment numerical data value is out of the predetermined reference range to set the failure state section and the normal state section according to the predetermined reference in order to analyze the failure cause.

According to an embodiment of the present disclosure, it is possible to set the section from the time point at which the equipment numerical data value has been measured out of the predetermined reference range to before the predetermined time to the failure state section, and to set the section from the starting time point of the failure state section to before the predetermined time to the normal state section.

According to the embodiment, it is possible to set the section from the time point at which the equipment numerical data value has been measured out of the predetermined reference range to before a predetermined time to the failure state section, and to set the section from the starting time point of the failure state section to before a predetermined time to the normal state section.

According to an embodiment of the present disclosure, it is possible to set the section from the time point at which the equipment numerical data value has been measured if the equipment numerical data value is out of the predetermined reference range to before the predetermined time to the failure state section, and to set the section from the starting time point of the failure state section to before the predetermined time to the normal state section.

According to an embodiment of the present disclosure, it is possible to set the section from the time point having fallen within the predetermined reference range to before the predetermined time to the state recovery section.

A failure inducible factor data set and a normal state data set composed of a plurality of failure inducible factor data for the normal state section are generated (operation S30).

According to an embodiment of the present disclosure, it is possible to generate the failure inducible factor data set and the normal state data set composed of the plurality of failure inducible factor data for the failure state section and the normal state section, after setting the failure state section and the normal state section.

According to an embodiment of the present disclosure, it is possible to set the section from the time point having fallen within the predetermined reference range to before the predetermined time to the state recovery section to generate the recovery time point data set composed of the plurality of failure inducible factor data for the state recovery section.

The influence indicator for each failure inducible factor is calculated by using the data corresponding to the failure inducible factor data set and the normal state data set (operation S40).

According to an embodiment of the present disclosure, it is possible to receive the data corresponding to the data set from the big data server, and to calculate the influence indicator for each failure inducible factor by using the received data.

According to an embodiment of the present disclosure, it is possible to receive the data corresponding to the data set, and to receive it in the form of a data table.

Here, the data table may mean a data format including the numerical data for each of the plurality of failure inducible factors but is not limited thereto.

According to an embodiment of the present disclosure, it is possible to calculate the influence indicator by comparing the numerical data of the failure state section and the normal state section with respect to the same failure inducible factor, respectively.

According to an embodiment of the present disclosure, it is possible to calculate the influence indicator through the formula such as the Equation 1.

According to the embodiment, as the influence indicator moves away from 1, the influence indicator may be regarded as relatively large.

According to an embodiment of the present disclosure, it is possible to periodically receive the normal state data set and the recovery state data set, and to calculate the influence indicator for each recovery inducible factor by using the received data corresponding to the recovery state data set and normal state data set.

According to an embodiment of the present disclosure, it is possible to calculate the influence indicator having reflected the data of the recovery state section through the formula such as the Equation 2.

According to the embodiment, as the influence indicator moves away from 1, the influence indicator may be regarded as relatively large.

Analysis result information is generated by selecting the failure inducible factor based on the calculated influence indicator (operation S50).

According to an embodiment of the present disclosure, it is possible to generate the analysis result information by selecting the failure inducible factor based on the calculated influence indicator.

According to an embodiment of the present disclosure, it is possible to calculate the influence indicator through the formulas such as the Equations 1 and 2 with respect to each failure inducible factor, and to determine the relatively small and large influence on the failure by comparing the calculated influence indicators.

According to an embodiment of the present disclosure, it is possible to generate the result information by comparing the influence indicators calculated for each failure inducible factor to select the failure inducible factor having the largest influence indicator as the failure cause.

According to another embodiment of the present disclosure, it is possible to generate the result information by selecting the failure inducible factors having a predetermined certain value or more among the influence indicators calculated for each failure inducible factor as the failure cause.

According to an embodiment of the present disclosure, it is possible to select the failure inducible factor by reflecting the calculated influence indicator and the number of cumulative times according to the influence indicator.

Embodiments of the present disclosure are not implemented only by the above-described apparatus and/or method, and although the embodiments of the present disclosure have been described in detail as described above, the scope of the present disclosure is not limited thereto and various modifications and improvements by those skilled in the art using the basic concept of the present disclosure as defined in the following claims are also included in the scope of the present disclosure.

What is claimed is:

1. A failure cause analyzing system using numerical data of vehicle equipment during vehicle operation, comprising:

an equipment numerical data analyzing apparatus for monitoring the equipment numerical data of a vehicle and generating at least one among a failure inducible factor data set, a normal state data set, and a state recovery data set to transmit it to a big data server if a value of the equipment numerical data is measured out of a predetermined reference range, and selecting a failure inducible factor based on a calculated influence indicator by receiving data corresponding to the data set from the big data server and calculating the influence indicator for each failure inducible factor; and the big data server for transmitting the received data corresponding to the data set to the equipment numerical data analyzing apparatus.

2. An equipment numerical data analyzing apparatus, comprising:

an equipment numerical data monitoring unit for periodically receiving vehicle state information comprising equipment numerical data from a plurality of sensors installed in a vehicle, and monitoring whether the received equipment numerical data value is out of a predetermined reference range;

a data set generating unit for setting a failure state section and a normal state section according to a predetermined reference if the equipment numerical data value is out of the predetermined reference range, and generating a failure inducible factor data set and a normal state data set composed of a plurality of failure inducible factor data for the failure state section and the normal state section;

a data set transmitting unit for transmitting the generated data set to a big data server;

an influence indicator calculating unit for receiving data corresponding to the data set from the big data server, and calculating an influence indicator for each failure inducible factor by using the received data; and a result information generating unit for generating analysis result information by selecting the failure inducible factor based on the calculated influence indicator.

3. The equipment numerical data analyzing apparatus according to claim 2, wherein the data set generating unit sets a section from a time point at which the equipment numerical data value has been measured if the equipment numerical data value is out of the predetermined reference range to before a predetermined time to the failure state section, and sets the section from a starting time point of the failure state section to before the predetermined time to the normal state section.

4. The equipment numerical data analyzing apparatus according to claim 2, wherein the equipment numerical data monitoring unit monitors whether the equipment numerical data value received after the failure state section falls within the predetermined reference range again, wherein the data set generating unit sets a section from a time point having fallen within the predetermined reference range to before a predetermined time to a state recovery section to generate a recovery time point data set composed of a plurality of failure inducible factor data for the state recovery section, and wherein the data set transmitting unit transmits the generated recovery time point data set to the big data server.

5. The equipment numerical data analyzing apparatus according to claim 2, wherein the result information generation unit reflects the calculated influence indicator and a number of cumulative times according to the influence indicator to select the failure inducible factor.

6. The equipment numerical data analyzing apparatus according to claim 4, wherein the influence indicator calculating unit periodically receives a failure state data set and a recovery state data set, and calculates the influence indicator for each recovery inducible factor by using data corresponding to the received failure state data set and recovery state data set, and wherein the result information generating unit selects the failure inducible factor based on the calculated influence indicator to reflect it to the analysis result information.

7. The equipment numerical data analyzing apparatus according to claim 6, wherein the analysis result generating unit reflects the calculated influence indicator and a number of cumulative times according to the influence indicator to select the failure inducible factor.

8. A failure cause analysis apparatus using numerical data of vehicle equipment during vehicle operation, comprising:

an equipment numerical data monitoring unit for periodically receiving vehicle state information comprising an equipment numerical data value from a plurality of sensors installed in a vehicle, and monitoring whether the received equipment numerical data value is out of a predetermined reference range;

a data set generating unit for setting a failure state section and a normal state section according to a predetermined reference if the equipment numerical data value is out of the predetermined reference range, and generating a failure inducible factor data set and a normal state data set composed of a plurality of failure inducible factor data for the failure state section and the normal state section;

an influence indicator calculating unit for calculating an influence indicator for each failure inducible factor by using data corresponding to the failure inducible factor data set and the normal state data set; and a result information generating unit for generating analysis result information by selecting the failure inducible factor based on the calculated influence indicator.

9. A failure cause analyzing method using numerical data of vehicle equipment during vehicle operation, comprising:

monitoring equipment numerical data of a vehicle, generating at least one among a failure inducible factor data set, a normal state data set, and a state recovery data set to transmit it to a big data server if a value of the equipment numerical data is measured out of a predetermined reference range, and selecting a failure inducible factor based on a calculated influence indicator by receiving data corresponding to the data set from the big data server and calculating the influence indicator for each failure inducible factor; and transmitting the received data corresponding to the data set to the equipment numerical data analyzing apparatus.

10. An equipment numerical data analyzing method, comprising:

periodically receiving vehicle state information comprising equipment numerical data from a plurality of sensors installed in a vehicle, and monitoring whether the received equipment numerical data value is out of a predetermined reference range;

setting a failure state section and a normal state section according to a predetermined reference if the equipment numerical data value is out of the predetermined reference range, and generating a failure inducible factor data set and a normal state data set composed of a plurality of failure inducible factor data for the failure state section and the normal state section;

transmitting the generated data set to a big data server;

receiving data corresponding to the data set from the big data server, and calculating an influence indicator for each failure inducible factor by using the received data; and generating analysis result information by selecting the failure inducible factor based on the calculated influence indicator.

11. The equipment numerical data analyzing method according to claim 10, wherein generating the data set sets a section from a time point at which the equipment numerical data value has been measured if the equipment numerical data value is out of the predetermined reference range to before a predetermined time to the failure state section, and sets the section from a starting time point of the failure state section to before the predetermined time to the normal state section.

12. The equipment numerical data analyzing method according to claim 10, wherein the monitoring monitors whether the equipment numerical data value received after the failure state section falls within the predetermined reference range again, wherein generating the data set sets a section from a time point having fallen within the predetermined reference range to before a predetermined time to a state recovery section to generate a recovery time point data set composed of a plurality of failure inducible factor data for the state recovery section, and wherein transmitting the data set to the big data server transmits the generated recovery time point data set to the big data server.

13. The equipment numerical data analyzing method according to claim 10, wherein generating the analysis result information reflects the calculated influence indicator and a number of cumulative times according to the influence indicator to select the failure inducible factor.

14. The equipment numerical data analyzing method according to claim 10, wherein calculating the influence indicator periodically receives a normal state data set and a recovery state data set, and calculates the influence indicator for each recovery inducible factor by using the data corresponding to the received recovery state data set and normal state data set, and wherein the generating the analysis result information selects the failure inducible factor based on the calculated influence indicator to reflect it to the analysis result information.

15. The equipment numerical data analyzing method according to claim 14, wherein generating the analysis result information reflects the calculated influence indicator and a number of cumulative times according to the influence indicator to select the failure inducible factor.

16. An equipment numerical data analyzing apparatus, comprising:

an equipment numerical data monitoring unit for periodically receiving vehicle state information comprising equipment numerical data from a plurality of sensors installed in a vehicle, and monitoring whether the received equipment numerical data value is out of a predetermined reference range;

a data set generating unit for setting a failure state section and a recovery state section according to a predetermined reference if the equipment numerical data value is out of the predetermined reference range, and generating a failure inducible factor data set and a normal state data set composed of a plurality of failure inducible factor data for the failure state section and the recovery state section;

a data set transmitting unit for transmitting the generated data set to a big data server;

an influence indicator calculating unit for receiving data corresponding to the data set from the big data server, and calculating an influence indicator for each failure inducible factor by using the received data; and a result information generating unit for generating analysis result information by selecting the failure inducible factor based on the calculated influence indicator.

17. The equipment numerical data analyzing apparatus according to claim 16, wherein the equipment numerical data monitoring unit monitors whether the equipment numerical data value received after the failure state section falls within the predetermined reference range again, wherein the data set generating unit sets a section from a time point having fallen within the predetermined reference range to before a predetermined time to a state recovery section to generate a recovery time point data set composed of a plurality of failure inducible factor data for the state recovery section, and wherein the data set transmitting unit transmits the generated recovery time point data set to the big data server.

18. An equipment numerical data analyzing method, comprising:

periodically receiving vehicle state information comprising equipment numerical data from a plurality of sensors installed in a vehicle, and monitoring whether the received equipment numerical data value is out of a predetermined reference range;

setting a failure state section and a recovery state section according to a predetermined reference if the equipment numerical data value is out of the predetermined reference range, and generating a failure inducible factor data set and a normal state data set composed of a plurality of failure inducible factor data for the failure state section and the recovery state section;

transmitting the generated data set to a big data server;

receiving data corresponding to the data set from the big data server, and calculating an influence indicator for each failure inducible factor by using the received data; and generating analysis result information by selecting the failure inducible factor based on the calculated influence indicator.

19. The equipment numerical data analyzing method according to claim 18, further comprising:

monitoring whether the equipment numerical data value received after the failure state section falls within the predetermined reference range again, generating a recovery time point data set composed of a plurality of failure inducible factor data for a state recovery section by setting a section from a time point having fallen within the predetermined reference range to before a predetermined time to the state recovery section, and transmitting the generated recovery time point data set to the big data server.

* * * * *